(12) United States Patent
Yamamoto et al.

(10) Patent No.: US 7,373,086 B2
(45) Date of Patent: May 13, 2008

(54) STANDARD RADIO FREQUENCY SIGNAL GENERATING METHOD AND STANDARD RADIO FREQUENCY SIGNAL GENERATING DEVICE

(75) Inventors: Takashi Yamamoto, Yokosuka (JP); Satoki Kawanishi, Yokahama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 870 days.

(21) Appl. No.: 10/446,971

(22) Filed: May 28, 2003

(65) Prior Publication Data
US 2003/0223757 A1 Dec. 4, 2003

(30) Foreign Application Priority Data
Jun. 3, 2002 (JP) ............................. 2002-161583
May 23, 2003 (JP) ............................. 2003-146263

(51) Int. Cl.
*H04B 10/12* (2006.01)
(52) U.S. Cl. ...................... 398/146; 398/187; 398/204
(58) Field of Classification Search ............... 398/146, 398/149, 164, 168–170, 185, 187, 204
See application file for complete search history.

(56) References Cited

U.S. PATENT DOCUMENTS

| 5,781,677 A | 7/1998 | Jin et al. | |
| 6,983,085 B2* | 1/2006 | Kataoka et al. | 385/3 |
| 7,038,190 B2* | 5/2006 | Udd et al. | 250/227.11 |
| 2002/0097469 A1* | 7/2002 | Yee et al. | 359/154 |
| 2004/0208436 A1* | 10/2004 | Hakimi et al. | 385/27 |

FOREIGN PATENT DOCUMENTS

| EP | 0 859 266 A2 | 8/1998 |
| JP | 10-246873 | 9/1998 |

(Continued)

OTHER PUBLICATIONS

"Exact millimetre wave frequency synthesis by injection locked laser comb line selection" by O.P. Gough, C.F.C. Silva, and A.J. Seeds, 1999 IEEE International Topical Meeting on Microwave Photonics, Melbourne, Australia, W-4.3, pp. 61-64, 1999.

(Continued)

*Primary Examiner*—Dzung Tran
(74) *Attorney, Agent, or Firm*—Harness, Dickey & Pierce, P.L.C.

(57) ABSTRACT

With a single laser light source, the line width of a beat signal is set to a few tens of kHz or less without it fluctuating over time, and the frequency thereof is set as desired. CW light from a CW laser light source is input into an electro-absorption modulator to which a sine wave electrical signal is applied. A modulation sideband which is made up from line spectra at separations equal to the modulation frequency is generated from the electroabsorption modulator. An optical fiber for higher-order soliton compression broadens the optical spectrum width, and increases the number of line spectra. A tunable wavelength filtering device which is made up from optical fiber gratings and optical circulators chooses two of the line spectra, which are combined by an optical coupler with their beat signal being heterodyne wave detected by a photo-detector.

16 Claims, 8 Drawing Sheets

FOREIGN PATENT DOCUMENTS

| | | |
|---|---|---|
| JP | 2000-249993 | 9/2000 |
| JP | 2001-264830 | 9/2001 |

OTHER PUBLICATIONS

"Limit of Optical Frequency Comb Generation due to Material Dispersion" by M. Kourogi, B. Widiyatomoko, Y. Takeuchi and M. Ohtsu, IEEE Journal of Quantum Electronics, vol. 31, No. 12, pp. 2120-2126, Dec. 1995.

Motonobu Kourogi et al., "Generation and application of a wide span optical frequency comb", Oyo Buturi, vol. 67, No. 5, pp. 551-554, 1998.

S. Kawanishi "Trends in Microwave-photonics and its application to radiowave astronomy", Proceedings of the IEICE General Conference, Mar. 7, 2001, Communication 2, pp. 784-785.

Gough, O.P. et al.; "Exact millimetre wave frequency synthesis by injection locked laser comb line selection"; Microwave Photonics, 1999; MWP '99; International Topical Meeting on Melbourne, Vic., Australia; Nov. 17-19, 1999; Piscataway, NJ, USA; IEEE, US; Nov. 17, 1999; pp. 61-64; XP010367465; ISBN: 0-7803-5558-X; the whole document.

Swanson, Eric A., et al.; "40-GHz Pulse Train Generation Using Soliton Compression of a Mach-Zehnder Modulator Output"; IEEE Photonics Technology Letters; IEEE Inc. New York, U.S.; vol. 7, No. 1; 1995; pp. 114-116; XP000488135; ISSN: 1041-1135; the whole document.

Pelusi, M.D. et al.; Frequency tunable femtosecond pulse generation from an electroabsorption modulator by enhanced higher order soliton compression in dispersion decreasing fibre; Electronics Letters; IEE Stevenage, GB; vol. 35, No. 9; Apr. 29, 1999; pp. 734-736; XP006012093; ISSN: 0013-5194; the whole document.

Morioka, Toshio; "Supercontinuum Lightwave Optical Sources for Large Capacity Transmission"; Proceedings of the European Conference on Optical Communication; XX, XX, vol. 2; Sep. 1985; pp. 821-828; XP002154727; the whole document.

Komukai, T et al.; "An Efficient 0.04-nm Apodized Fiber Bragg Grating and Its Application to Narrow-Band Spectral Filtering"; IEEE Photonics Technology Letters, IEEE Inc. New York, US; vol. 9, No. 7; Jul. 1, 1997; pp. 934-936; XP000659096; ISSN: 1041-1135; the whole document.

Okamoto, K et al.; "Fabrication of frequency spectrum synthesiser consisting of arrayed-waveguide grating pair and thermo-optic amplitude and phase controllers"; Electronics Letters, IEE Stevenage, GB; vol. 35, No. 9; Apr. 29, 1999; pp. 733-734; XP006012104; ISSN: 0013-5194; the whole document.

Yamamoto, T. et al.; "270-360 GHz tunable beat signal light generator for photonic local oscillator"; Electronics Letters, IEE Stevenage, GB; vol. 38, No. 15; Jul. 18, 2002; pp. 795-797; XP006018575; ISSN: 0013-5194; the whole document.

European Search Report for Application No. 03101580, Mailed Sep. 12, 2003.

* cited by examiner

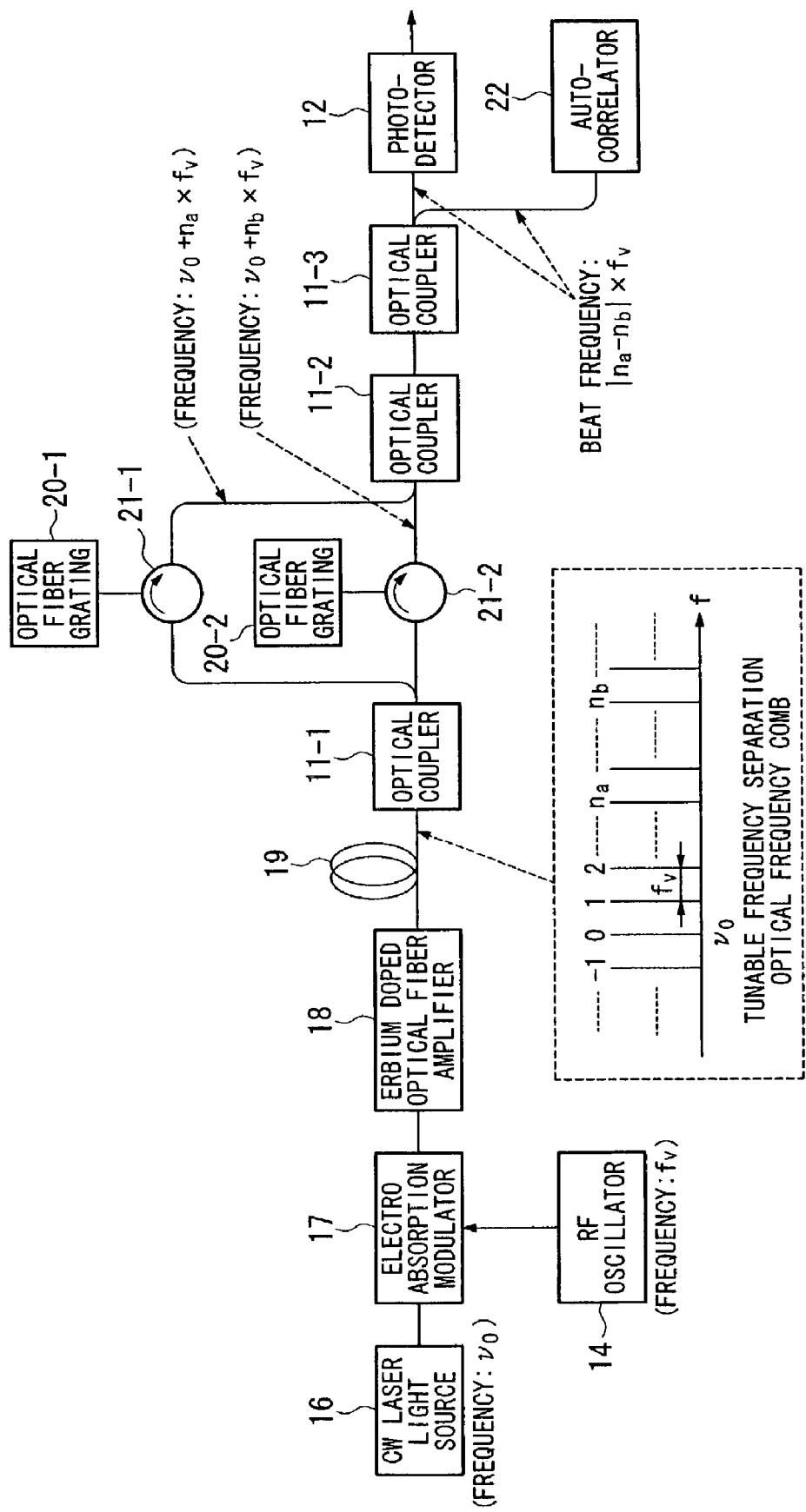

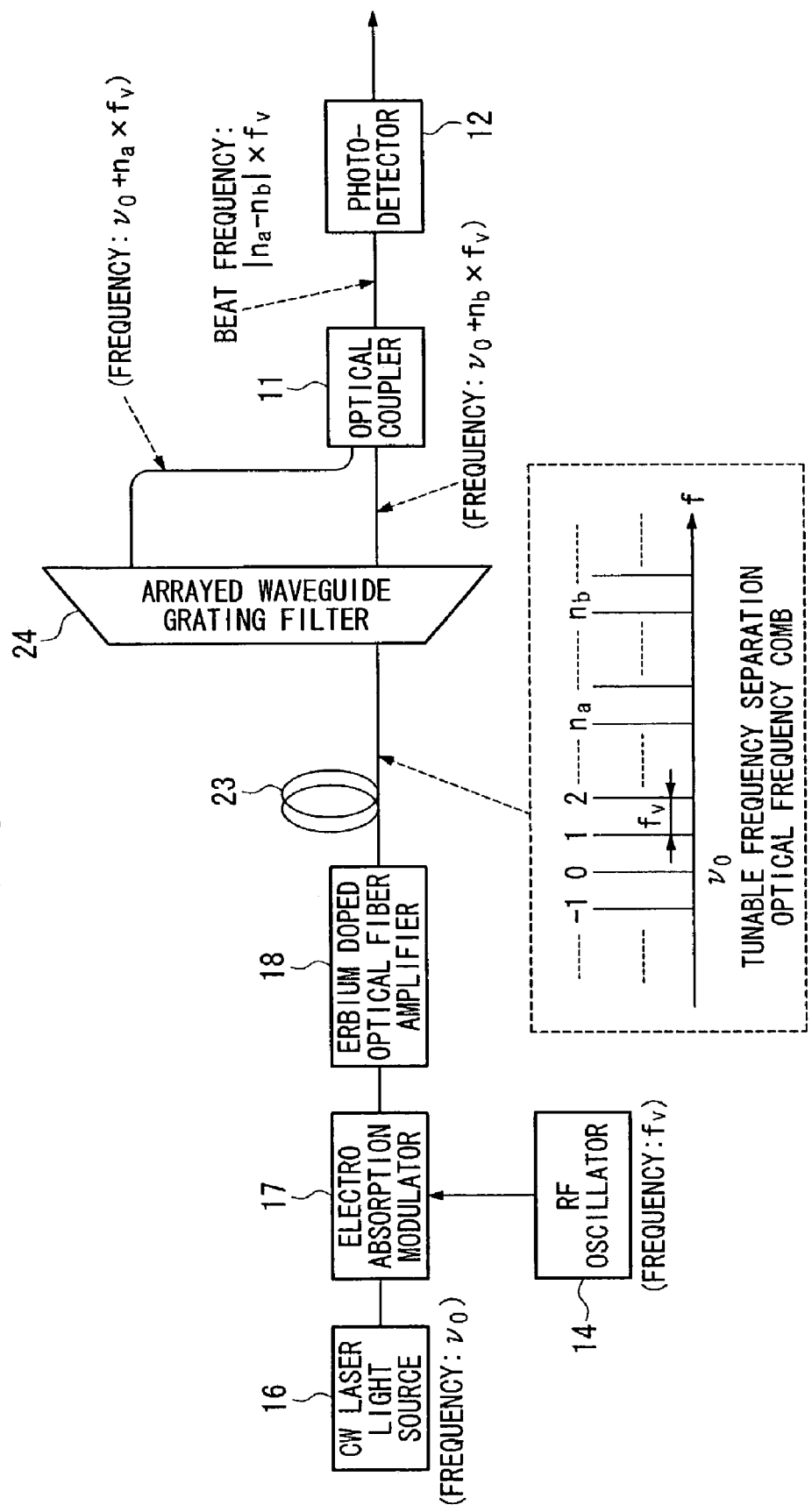

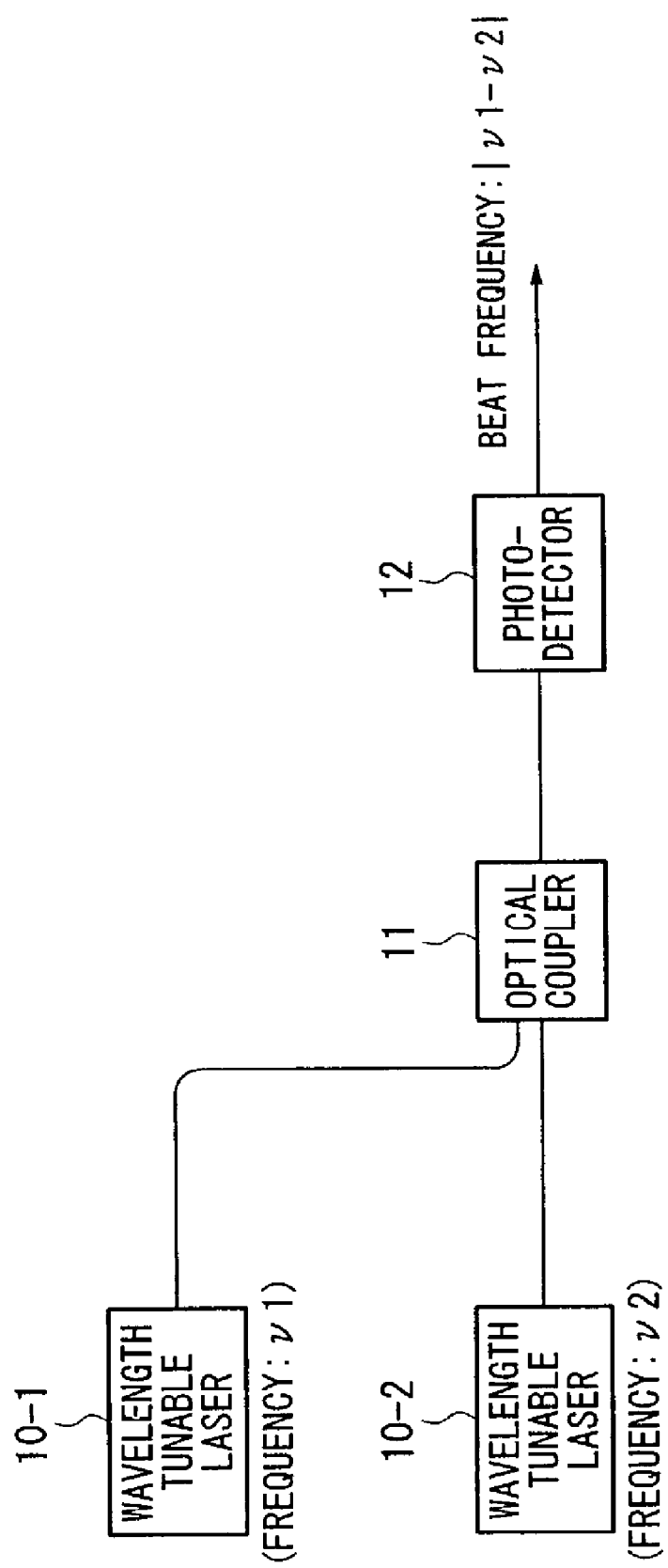

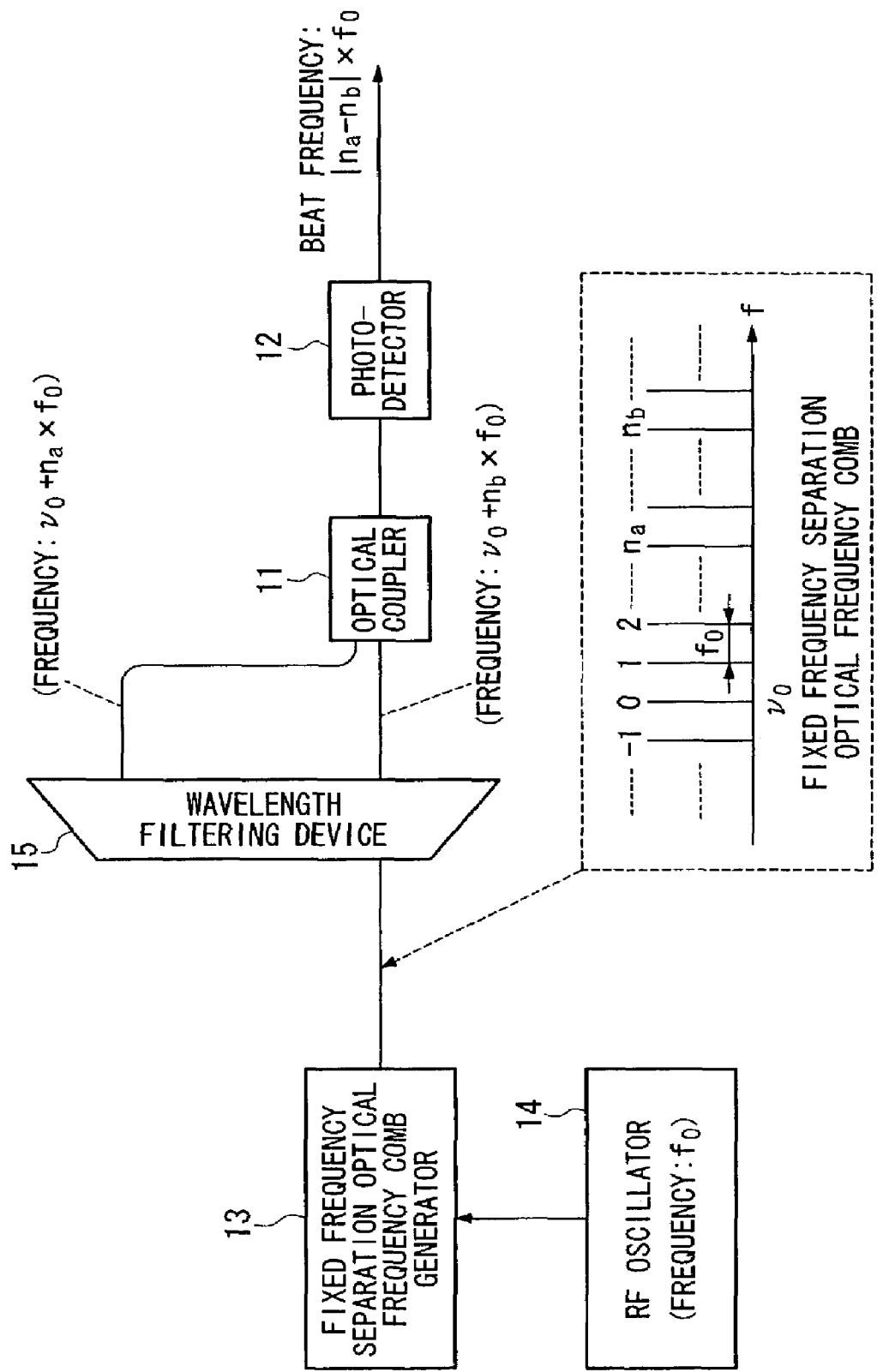

US 7,373,086 B2

STANDARD RADIO FREQUENCY SIGNAL GENERATING METHOD AND STANDARD RADIO FREQUENCY SIGNAL GENERATING DEVICE

BACKGROUND OF THE INVENTION

1. Field of the Invention

The present invention relates to a standard radio frequency signal generating method and to a standard radio frequency signal generating device, which heterodyne detect CW light which has two different wavelengths, and generate the difference frequency signal.

2. Description of the Related Art

Conventionally, there are two principal standard radio frequency signal generating methods. The first of these standard radio frequency signal generating methods is one which takes advantage of the difference frequency between light beams output from two CW lasers. The second of these standard radio frequency signal generating methods is one in which an optical frequency comb consisting of a plurality of line spectra spaced at a fixed frequency separation is generated, two line spectra are selected from these line spectra, and their difference frequency is taken advantage of.

FIG. 7 is a block diagram showing an example of the structure of a standard radio frequency signal generating device to which the above described first conventional standard radio frequency signal generating method has been applied (refer to, for example, "Exact millimeter wave frequency synthesis by injection locked laser comb line selection" by O. P. Gough, C. F. C. Silva, and A. J. Seeds, 1999 IEEE International Topical Meeting on Microwave Photonics, Melbourne, Australia, W-4.3, pp. 61-64, 1999). The light beams from two wavelength-tunable lasers 10-1, 10-2 are combined by an optical coupler 11, and are heterodyne detected by a photo-detector (photodiode) 12. It is possible to change the beat frequency as desired by changing the wavelengths of the lasers.

FIG. 8 is a block diagram showing an example of the structure of a standard radio frequency signal generating device to which the above described second conventional standard radio frequency signal generating method has been applied (refer to, for example, "Limit of Optical Frequency Comb Generation due to Material Dispersion" by M. Kourogi, B. Widiyatomoko, Y. Takeuchi, and M. Ohtsu, IEEE Journal of Quantum Electronics, vol. 31, no. 12, pp. 2120-2126, December 1995). As a method for generating an optical frequency comb at a fixed frequency separation, there are a method in which a mode locked pulse laser is employed, or a method in which light of a single frequency is passed through a Fabry-Perot resonator which installs a phase modulator which performs phase modulation at high amplitude. In the spectrum of light output from a fixed frequency separation optical frequency comb generator 13, a plurality of line spectra are generated at separations which are equal to the modulation frequency. Two of these line spectra are selected by a wavelength filtering device 15 and are combined by an optical coupler 11, and the beat signal thereof is heterodyne detected by a photo-detector (photodiode) 12.

With the above described first standard radio frequency signal generating method, two laser light sources are required, and the spectral line width of the beat signal is determined by the line width of the two lasers. Accordingly, if a DFB laser is employed, it is difficult to make the spectral line width of the beat signal be equal to or less than a few tens of kHz. Furthermore, it is extremely difficult to stabilize the oscillation frequency of the laser light sources to the order of kHz. As a result, there is the problem that the frequency of the beat signal fluctuates over time.

Furthermore, with the above described second standard radio frequency signal generating method, it is possible to manage with a single laser light source. However, if a mode locked pulse laser is employed as the optical frequency comb generator, its repetition frequency is limited by the cavity length of the laser. Due to this, there is the problem that it is not possible to vary the beat frequency as desired which is an integral multiple of the repetition frequency. In the same manner, with an optical frequency comb generator which takes advantage of a phase modulator within a Fabry-Perot resonator as well, there is still the problem that it is not possible to vary the beat frequency as desired, since the modulation frequency is limited by the resonator length of the Fabry-Perot resonator.

SUMMARY OF THE INVENTION

The present invention has been conceived in consideration of the above matters, and its objective is to provide a standard radio frequency signal generating method and a standard radio frequency signal generating device, which are capable of operating using only a single laser light source, which can keep the line width of a beat signal which is obtained to a few tens of kHz or less, which can prevent the frequency thereof fluctuating over time, and with which the frequency can be set as desired.

In order to solve the above described problems, the standard radio frequency signal generating method according to the present invention includes: a modulation sideband generating step of generating a modulation sideband made from a plurality of line spectra by modulating CW light with a frequency tunable modulator; a line spectra selection step of selecting two of the line spectra of different wavelength from among the plurality of line spectra with a wavelength filtering device; and a detection step of generating a difference frequency signal by heterodyne detecting the beat signal of the two line spectra which have been selected.

The modulation sideband generating step may include a line spectra increase step of increasing the number of line spectra of the modulation sideband by passing the modulation sideband through a nonlinear optical material; with, in the line spectra selection step, the two line spectra of different wavelengths being selected from among the line spectra of which the number has been increased by the line spectra increase step.

Furthermore, in the line spectra increase step, a nonlinear optical fiber may be used as the nonlinear optical material.

Furthermore, in the line spectra increase step, an optical fiber for higher-order soliton compression, which is endowed with a higher-order soliton compression function, may be used as the nonlinear optical fiber.

Furthermore, in the line spectra increase step, as the nonlinear optical fiber, there may be used a dispersion decreasing optical fiber whose dispersion changes from anomalous dispersion to normal dispersion from an incident end thereof towards an emission end thereof, or an optical fiber for supercontinuum generation which is made from an optical fiber of uniform normal dispersion along an entire length in the longitudinal direction.

Furthermore, in the line spectra selection step, the two line spectra of different wavelengths may be selected by two fiber gratings which are connected via two optical circulators and have different reflection wavelengths.

Furthermore, in the line spectra selection step, the two line spectra of different wavelengths may be selected by an arrayed waveguide grating filter which is made from a plurality of waveguides of different lengths, and which multiplexes and demultiplexes light beams of a plurality of wavelengths.

Yet further, in order to solve the above described problems, the standard radio frequency signal generating device according to the present invention includes: a light source which generates CW light of two different wavelengths; a combiner which combines the CW light of two wavelengths and generates a beat signal of the CW light of two wavelengths; and a detector which heterodyne detects the beat signal, wherein the light source which generates the CW light of two different wavelengths comprises: a single CW laser light source; a modulation sideband generating unit which comprises a modulator whose modulation frequency is tunable, and which generates a modulation sideband made from a plurality of line spectra by modulating the CW light from the CW laser light source with the modulator; and a tunable wavelength filtering device, which selects two of the line spectra from light output from the modulation sideband generating unit.

It is desirable for the modulation sideband generating unit further to comprise a nonlinear optical material which increases the number of line spectra of the modulation sideband which is generated by the modulator and outputs to the wavelength filtering device; with the wavelength filtering device selecting the two line spectra from light output from the nonlinear optical material.

It is also possible for the nonlinear optical material to be a nonlinear optical fiber.

It is also possible for the nonlinear optical fiber to be an optical fiber for higher-order soliton compression, which is endowed with a higher-order soliton compression function.

It is also possible for the nonlinear optical fiber to be a dispersion decreasing optical fiber whose dispersion changes from anomalous dispersion to normal dispersion from an incident end thereof towards an emission end thereof, or is an optical fiber for supercontinuum generation which is made from an optical fiber of uniform normal dispersion along an entire length in the longitudinal direction.

Furthermore, it is also possible for the wavelength filtering device to include two fiber gratings which are connected via two optical circulators and have different reflection wavelengths.

Furthermore, it is also possible for the wavelength filtering device to include an arrayed waveguide grating filter which is made from a plurality of waveguides of different lengths, and which multiplexes and demultiplexes light beams of a plurality of wavelengths.

With the present invention: a modulation sideband which is made up from a plurality of line spectra is generated by modulating CW light with a frequency tunable modulator; according to requirements, the number of line spectra which are generated is increased by passing through a nonlinear optical material; and, furthermore, two of these line spectra of different wavelengths are selected by a wavelength filtering device, and the beat signal thereof is heterodyne detected.

Accordingly, while using only a single laser light source, it is possible to set the line width of a beat signal which is obtained to a few tens of kHz or less, and it is possible to prevent the frequency thereof fluctuating over time, and moreover it is possible to set the frequency as desired.

BRIEF DESCRIPTION OF THE DRAWINGS

FIG. 1 is a block diagram showing the structure of a standard radio frequency signal generating device according to a first preferred embodiment of the present invention.

FIG. 6 is a block diagram showing the structure of a standard radio frequency signal generating device according to a second preferred embodiment of the present invention.

FIG. 7 is a block diagram showing a first concrete example of a conventional photonic oscillation device.

FIG. 8 is a block diagram showing a second concrete example of a conventional photonic oscillation device.

DETAILED DESCRIPTION OF THE PREFERRED EMBODIMENTS

Figure 2A:
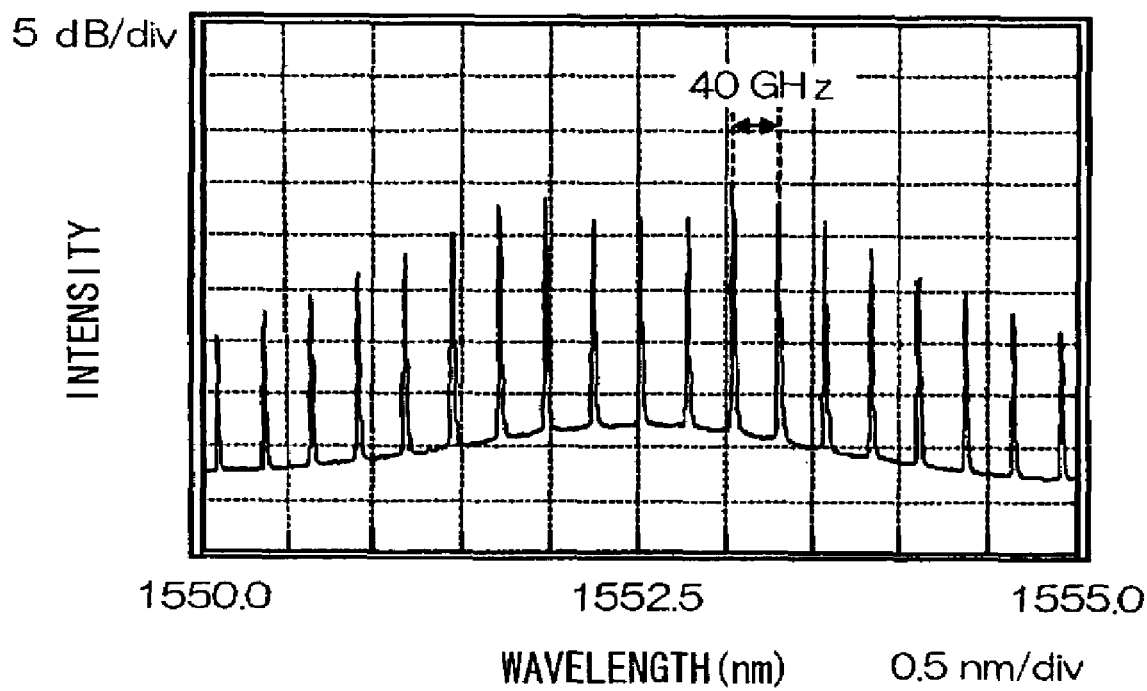
FIG. 2A is a graph showing an optical spectrum (a plurality of line spectra at separations of 40 GHz) with this structure of the first preferred embodiment, after higher-order soliton compression.

In the following, various preferred embodiments according to the present invention will be explained with reference to the appended drawings.

A. The First Preferred Embodiment

FIG. 1 is a block diagram showing the structure of a standard radio frequency signal generating device according to the first preferred embodiment of the present invention. In FIG. 1, CW light of frequency $v_0$ output from a CW laser light source 16 is input into an electroabsorption (EA) modulator 17. A sine wave electrical signal of frequency fv from an RF oscillator 14 is applied to the EA modulator 17. As a result, the light output from the electroabsorption modulator 17 consists of pulses of repetition frequency fv, and its optical spectrum has a plurality of line spectra centered about the frequency $v_0$ of the original CW light and spaced at a separation of fv. After the light output from this electroabsorption modulator 17 has been amplified by an erbium doped optical fiber amplifier (EDFA) 18, it is input upon an optical fiber 19 for higher-order soliton compression.

Higher order soliton compression is a process which takes advantage of the fact that, when a soliton of soliton order number N which is greater than 1 is propagated along an optical fiber which has an anomalous dispersion region, its time evolution takes a periodic form, and it is squeezed into a temporary width at the start of each period. The condition for the soliton order number to be greater than 1 is given by the following Equation (1):

$$N = \sqrt{\frac{\pi n_2 v_0 P_0 T_{FWHM}^2}{2\ln 2 \cdot cA_{eff} |\beta_2|}} > 1 \wedge \quad (1)$$

Here, $n_2$ is the nonlinear refractive index coefficient of the optical fiber, $P_0$ is the peak intensity of the incident pulse, $T_{FWHM}$ is the pulse width of the incident pulse, c is the speed of light in a vacuum, $A_{eff}$ is the effective area of the optical fiber, and $\beta_2$ is the second order dispersion value of the optical fiber. Accordingly, for higher-order soliton compression, an optical fiber is required which has values of $A_{eff}$ and of $|\beta_2|$ which satisfy Equation (1) and for which also $\beta_2$ is negative. It should be understood that, for the details of higher-order soliton compression technology, reference should be made to "Applications of Nonlinear Fiber Optics", by G. P Agrawal (Academic Press).

Higher-order soliton compression by the optical fiber 19 narrows the pulse width of the optical pulse, broadens the spectrum width, and increases the number of line spectra which are generated.

After broadening the spectrum width, the light is branched by an optical coupler 11-1. Two optical fiber gratings 20-1 and 20-2 which have mutually different reflection wavelengths are connected to the output of the optical coupler 11-1 via optical circulators 21-1 and 21-2, and each optical fiber grating selects one wavelength among the line spectra.

The two line spectra which have thus been selected are combined by an optical coupler 11-2, and thereby a beat signal of frequency $|n_a - n_b| \times fv$ (where $n_a$ and $n_b$ are integers) is generated. This beat signal is branched by an optical coupler 11-3, and is input upon a photo-detector 12 and an autocorrelator 22. Heterodyne detection is performed by the photo-detector 12, and the time waveform of the beat signal is measured by the autocorrelator 22.

Here, the separation of the line spectra after higher-order soliton compression can be set to any desired value by varying the modulation frequency fv of the electroabsorption modulator 17. In other words, the optical frequency comb which is obtained by this method is one whose frequency separation is tunable.

In this case, the peak intensity and/or the pulse width of the optical pulse before higher order soliton compression may be varied by changing the modulation frequency fv. As a result, the optical spectrum waveform after higher-order soliton compression changes, and it may happen that a sufficient S/N ratio for the desired line spectrum is not obtained. In this connection, by varying the output intensity of the erbium doped optical fiber amplifier 18 before the higher-order soliton compression, and/or the amplitude of the sine wave electrical signal which is input into the electroabsorption modulator 17, the peak intensity and/or the pulse width of the optical pulse may be adjusted; and, by appropriately changing the optical spectrum waveform after the higher-order soliton compression, it is possible to obtain a sufficient S/N ratio for the desired line spectrum.

Furthermore, along with changing the modulation frequency fv of the electroabsorption modulator 17 and thereby changing the separation between the line spectra, the reflection wavelength may be set to the desired line spectrum wavelength by physically expanding or contracting the optical fiber grating.

Here, the results will be described of performing measurements in a set of actual experiments with the structure of this first preferred embodiment.

As the CW laser light source 16, a solid state laser of wavelength 1552.5 nm (frequency $v_0$=193.10 THz) was used. As the optical fiber 19 for higher-order soliton compression, one of length 5 km and mode field diameter 4.2 µm was used. Furthermore, with the optical fiber 19 for higher-order soliton compression, the second order dispersion value at the wavelength 1552.5 nm was −0.96 ps²/km. In other words, anomalous dispersion of the incident light was present.

Figure 2B:
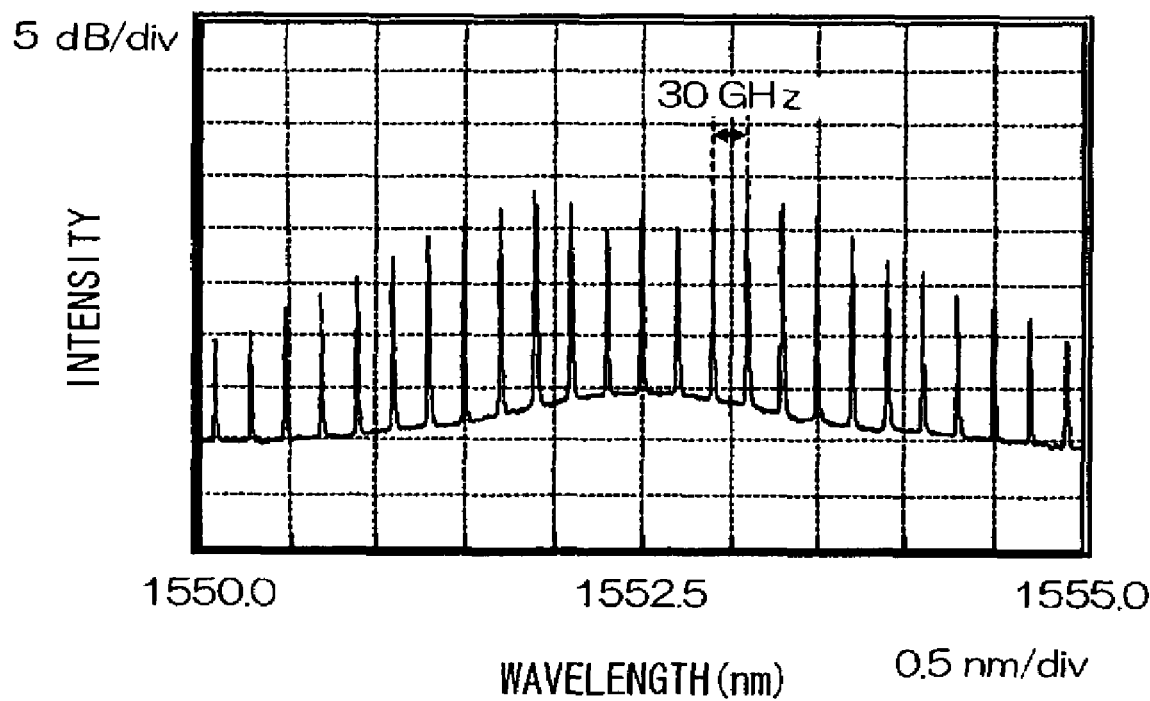
FIG. 2B is a graph showing an optical spectrum (a plurality of line spectra at separations of 30 GHz) with this structure of the first preferred embodiment, after higher-order soliton compression.

FIGS. 2A and 2B are graphs showing the optical spectra after higher-order soliton compression when the modulation frequency fv of the electroabsorption modulator 17 was set to 40 GHz and to 30 GHz, respectively. As shown in this figure, line spectra were generated at separations of 40 GHz and 30 GHz respectively.

Figure 3A:
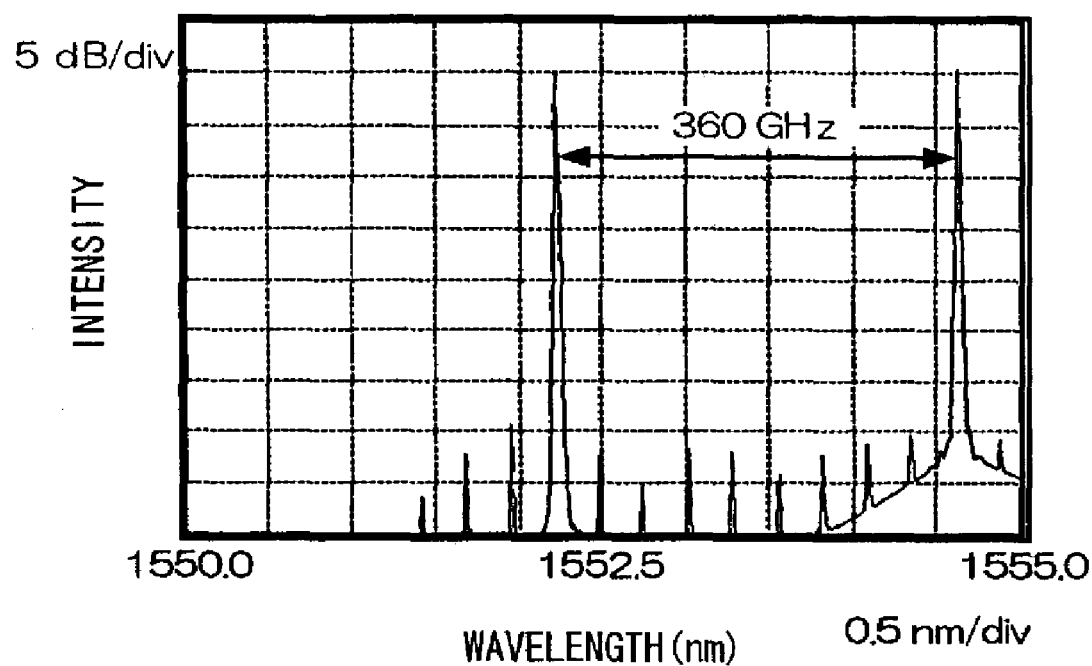
FIG. 3A is a graph showing an optical spectrum (two line spectra at a separation of 360 GHz) with this structure of the first preferred embodiment, after wavelength filtering by an optical fiber grating and combination by an optical coupler have been performed.
Figure 3B:
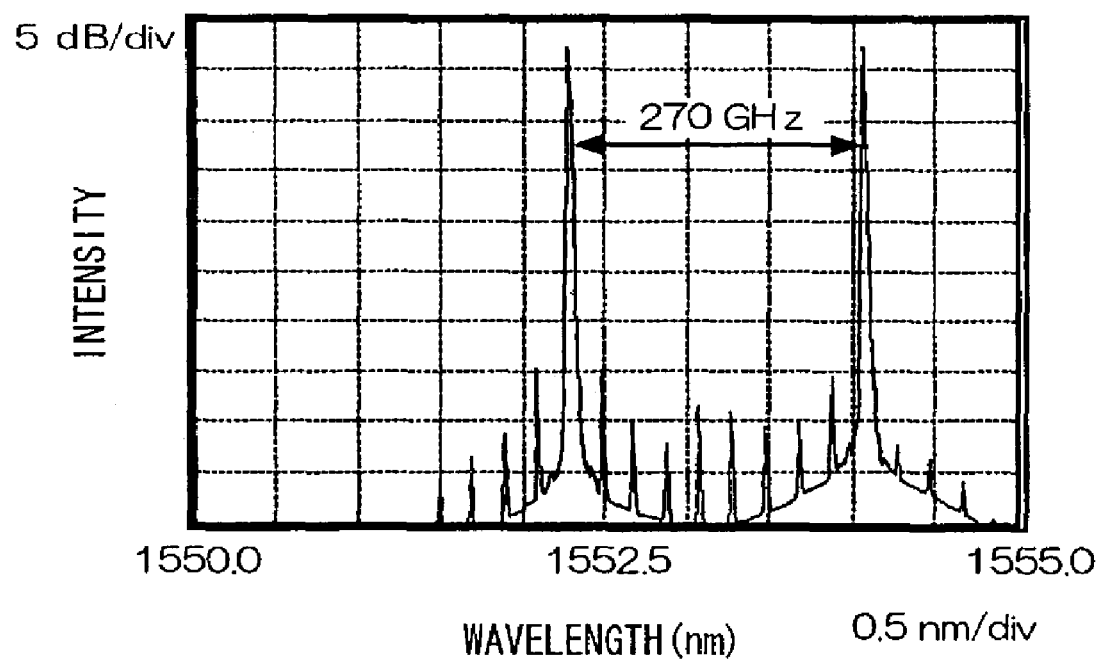
FIG. 3B is a graph showing an optical spectrum (two line spectra at a separation of 270 GHz) with this structure of the first preferred embodiment, after wavelength filtering by an optical fiber grating and combination by an optical coupler have been performed.

Furthermore, FIGS. 3A and 3B are graphs showing the optical spectra after selection of two line spectra spaced at nine line spectra (with a frequency separation of 360 GHz and 270 GHz respectively) from the light after higher-order soliton compression corresponding to FIGS. 2A and 2B, using the optical fiber gratings 20-1 and 20-2 and combination of the selected two line spectra with the optical coupler 11-2.

Figure 4A:
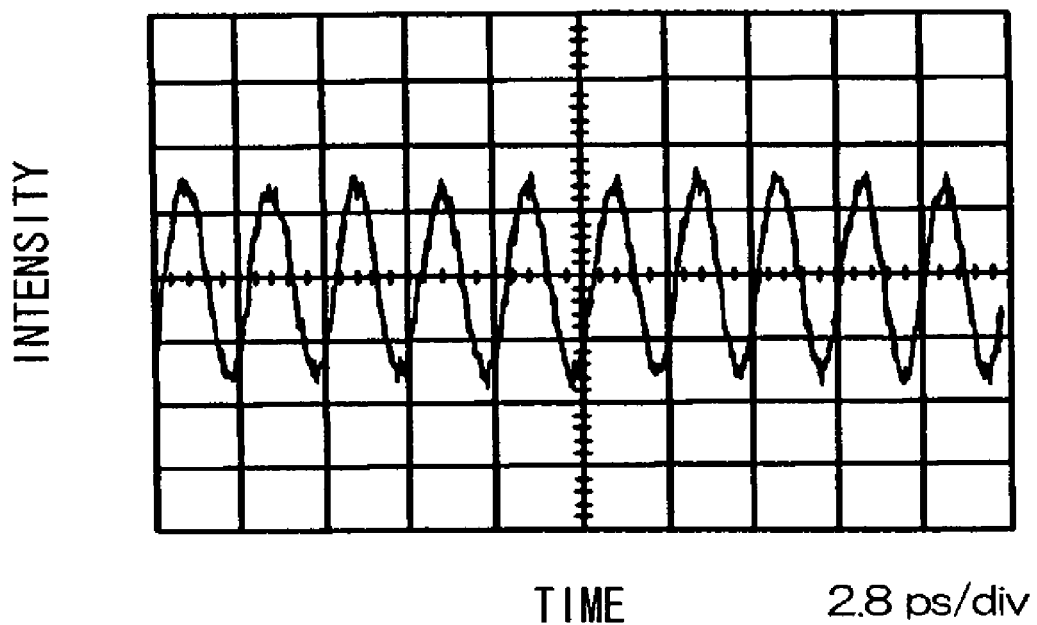
FIG. 4A is a graph showing the waveform of a beat signal (the autocorrelation waveform of a beat signal at a separation of 360 GHz) with this structure of the first preferred embodiment, as measured by an autocorrelator.
Figure 4B:
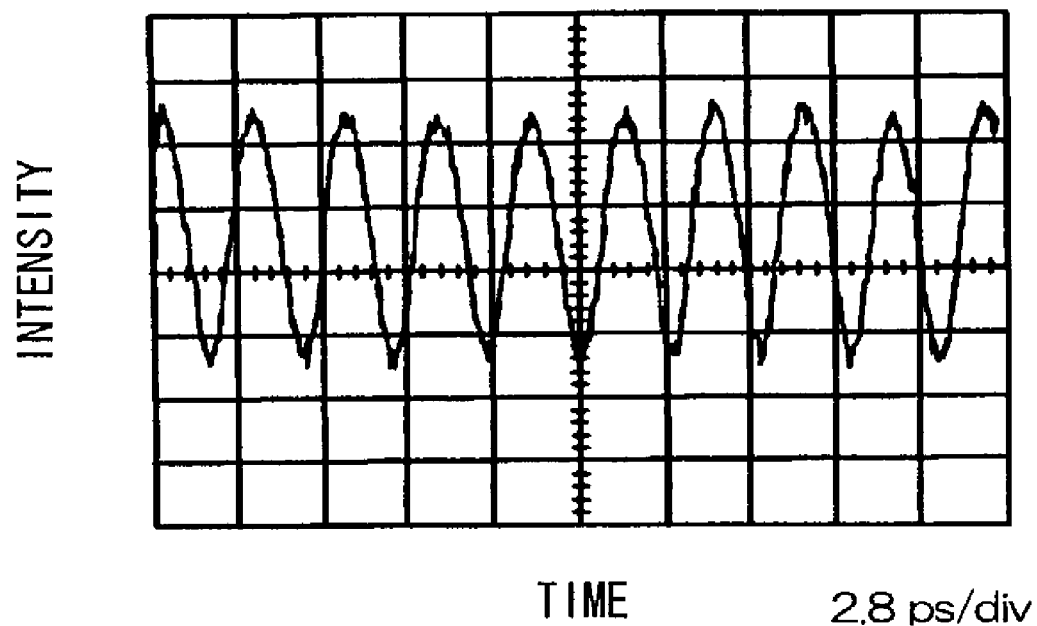
FIG. 4B is a graph showing the waveform of a beat signal (the autocorrelation waveform of a beat signal at a separation of 270 GHz) with this structure of the first preferred embodiment, as measured by an autocorrelator.

Yet further, FIGS. 4A and 4B are graphs showing the results of measurement with the autocorrelator 22 of the beat signal waveform due to the two line spectra with a frequency separation of 360 GHz and 270 GHz respectively corresponding to FIGS. 3A and 3B. As shown in these figures, it will be understood that time waveforms are obtained at frequencies of 360 GHz and 270 GHz.

Although only the results of measurement at the two frequencies of 360 GHz and 270 GHz are shown, in actual fact, it is possible to vary the frequency continuously over a wide range. For example, by varying the modulation frequency fv of the electroabsorption modulator 17 continuously from 30 GHz to 40 GHz, a beat frequency may be obtained continuously from 270 GHz to 360 GHz.

Figure 5:
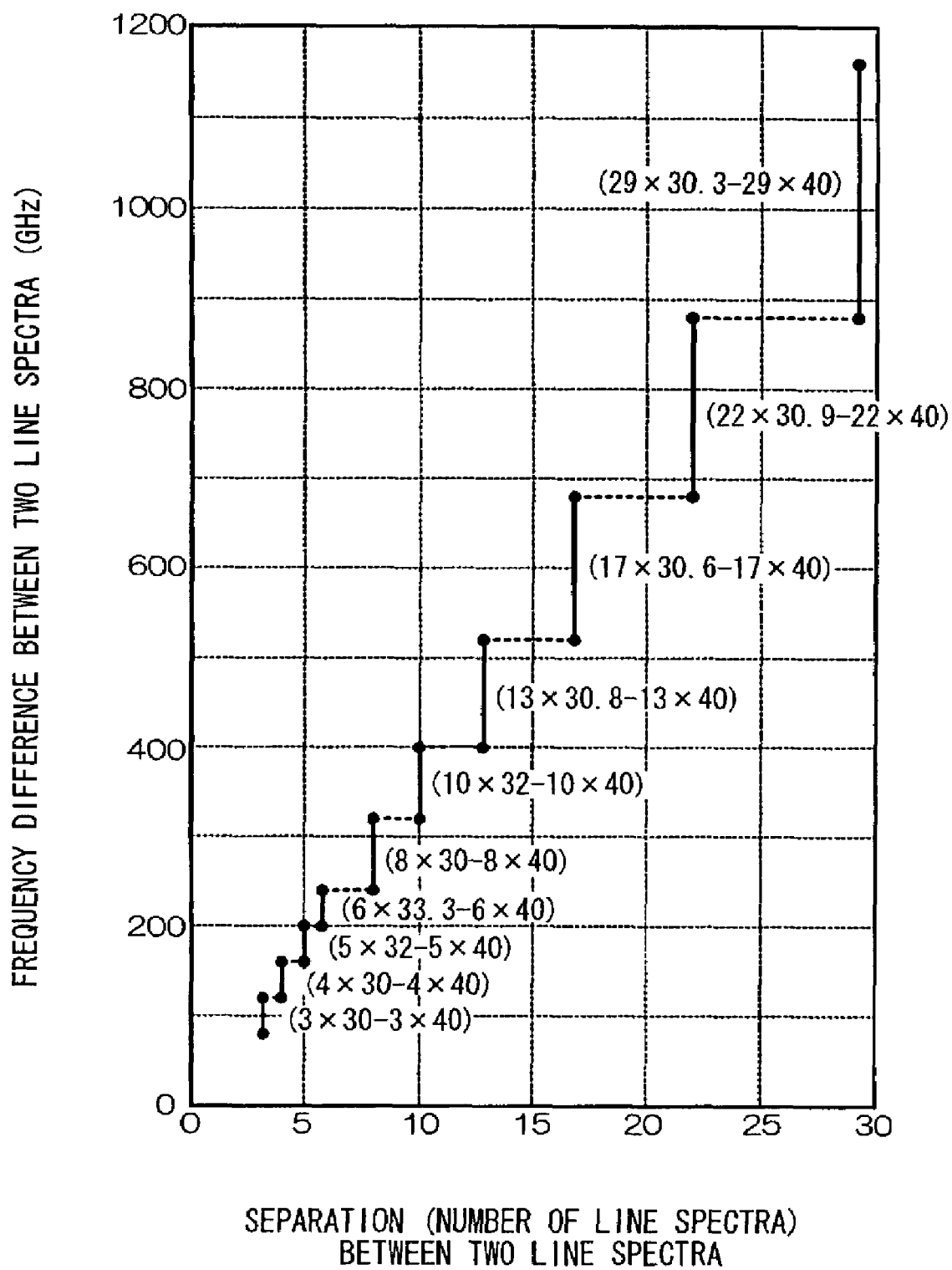
FIG. 5 is a graph showing that any frequency from 100 GHz to 1 THz can be generated by the standard radio frequency signal generating method according to the present invention.

Even if the range over which the modulation frequency fv of the electroabsorption modulator 17 can be varied is, for example, limited to only the frequency range between 30 GHz and 40 GHz, it is nevertheless possible to obtain a beat signal of any frequency in the frequency range from 100 GHz to 1000 GHz without any gaps, by changing the two line spectra which are selected. FIG. 5 shows this concept. As shown in that figure, it will be understood that it is possible to obtain any beat signal frequency in the frequency range from 100 GHz to 1000 GHz (=1 THz). As an example, it is possible to obtain a difference frequency continuously over the range from 320 GHz to 400 GHz by selecting an appropriate two of the line spectra which are spaced a separation of ten line spectra, and by varying the modulation frequency fv from 32 GHz to 40 GHz and performing heterodyne detection.

It should be understood that the various numerical values which have been concretely presented in the explanation of the first preferred embodiment of the present invention given above are only given by way of example, and that the present invention is not to be considered as being limited thereby.

B. The Second Preferred Embodiment

Next, a second preferred embodiment according to the present invention will be explained. FIG. 6 is a block diagram showing the structure of a standard radio frequency signal generating device according to the second preferred embodiment of the present invention. It should be understood that, to elements which correspond to ones shown in FIG. 1, the same reference symbols are appended, and their explanation will be curtailed.

With this second preferred embodiment, an optical fiber 23 for supercontinuum generation is used as the optical fiber which increases the number of line spectra included in the output from the electroabsorption modulator 17, and selection of two of the line spectra is performed by an arrayed waveguide grating filter 24.

The dispersion characteristics of such optical fibers 23 for supercontinuum generation can be generally divided into two types. One of these types is a dispersion decreasing optical fiber whose dispersion varies from anomalous dispersion to normal dispersion as a light pulse travels from its incident end to its emission end, while the other of these types is an optical fiber with uniform normal dispersion along its entire length in the longitudinal direction. Although with the former type there is the problem that the vicinity of the center of its optical spectrum is not smooth so that unnecessary peaks are generated, there is the beneficial aspect that a lower incident light intensity will suffice, since the beneficial effect of pulse compression due to adiabatic soliton compression is employed. By contrast, although with the latter type there is the problem that an incident light intensity which is several tens of times or more that of the former is required, there is the beneficial aspect that it is possible to generate a smooth optical spectrum without any peaks.

It is possible to employ an optical fiber 23 for supercontinuum generation of either of these types as a material for generating the line spectra which are required for the present invention.

The arrayed waveguide grating filter 24 is an element which is made up from a plurality of waveguides of different lengths, and which can multiplex and demultiplex light beams of a large number of wavelengths at the same time. This arrayed waveguide grating filter 24 selects two of the line spectra with a desired frequency separation from the plurality of line spectra output from the optical fiber 23 for supercontinuum generation. These two line spectra which have been selected are combined with an optical coupler 11, and heterodyne detection of a beat signal of frequency $|n_a - n_b| \times fv$ (where $n_a$ and $n_b$ are integers) is performed with a photo-detector 12. It is possible to select two line spectra of any desired frequency separation by varying the temperature of the arrayed waveguide grating filter 24 and shifting the transmission spectrum region of its output ports, and by appropriately choosing the output port of the arrayed waveguide grating filter 24.

In this manner, in the same way as with the first preferred embodiment described above, it is possible to obtain a beat signal of any desired frequency from 100 GHz to 1000 GHz without any gaps, even if the range over which the modulation frequency fv of the electroabsorption modulator 17 can be varied is limited to only between 30 GHz and 40 GHz.

With the above described first and second preferred embodiments according to the present invention, it is possible to make do with a requirement for only one laser light source, and it is possible to vary the frequency separations of the line spectra by changing the frequency of the sine wave electrical signal which is applied to the modulator. In other words, the frequency separation of the optical frequency comb which is obtained with this method is tunable. In addition, it is possible to obtain a difference frequency signal of any desired frequency over a wide frequency range by changing the two line spectra which are picked out by the wavelength filtering device. Here, the frequency of the difference frequency signal does not fluctuate over time, since it is strictly constrained to an integral multiple of the frequency of the sine wave electrical signal which is applied to the modulator. Furthermore, the line width of the difference frequency signal below a few tens of kHz can easily be obtained, since the line width of the difference frequency signal is the same as the line width of the sine wave electrical signal which is applied to the modulator. As a result, it becomes possible to generate easily and moreover stably a signal with a frequency in the millimeter wavelength region or the sub-millimeter wavelength region, which cannot be generated by any electrical method.

It should be understood that although, with the above described first and second preferred embodiments according to the present invention, the optical fiber 19 for higher-order soliton compression and the optical fiber 23 for supercontinuum generation were employed as the nonlinear optical fiber for increasing the number of line spectra, it would also be possible to utilize some different nonlinear optical fiber other than these. Furthermore, the present invention is not limited to the use of a nonlinear optical fiber; it would be possible to utilize any nonlinear optical material (for example, a semiconductor optical amplifier or a nonlinear optical crystal).

Furthermore, as the combination of a nonlinear optical material and a wavelength filtering device, the first preferred embodiment employed the combination of the optical fiber 19 for higher-order soliton compression with the optical fiber gratings 20-1 and 20-2 and the optical circulators 21-1 and 21-2, while the second preferred embodiment employed the combination of the optical fiber 23 for supercontinuum generation and the arrayed waveguide grating filter 24. However, it would be possible to utilize various other combinations of a nonlinear optical material and a wavelength filtering device. For example, in FIG. 1, it would also be possible to utilize the optical fiber 23 for supercontinuum generation, instead of the optical fiber 19 for higher-order soliton compression. In the same manner, in FIG. 6, it would be possible to utilize the optical fiber 19 for higher-order soliton compression, instead of the optical fiber 23 for supercontinuum generation.

Furthermore if the frequency of the standard radio frequency signal which is required is not quite high, for example around 100 GHz, then it would be acceptable not to perform spectrum broadening (increase of the number of line spectra) with a nonlinear optical material. In this case, it would be possible to omit the optical fiber 19 for higher-order soliton compression shown in FIG. 1 and the optical fiber 23 for supercontinuum generation shown in FIG. 6.

What is claimed is:

1. A standard radio frequency signal generating method comprising:

a modulation sideband generating step comprising a step of generating a modulation sideband made from a plurality of line spectra by modulating CW light with a frequency tunable modulator, and a line spectra increase step of increasing the number of line spectra of the modulation sideband by passing the modulation sideband through a nonlinear optical material;

a line spectra selection step of selecting, with a wavelength filtering device, two of the line spectra of different wavelengths from among the line spectra of which the number has been increased by the line spectra increase step; and a detection step of generating a difference frequency signal by heterodyne detecting a beat signal of the two line spectra which have been selected by the line spectra selection step.

2. A standard radio frequency signal generating method as described in claim 1, wherein, in the line spectra increase step, a nonlinear optical fiber is used as the nonlinear optical material.

3. A standard radio frequency signal generating method as described in claim 2, wherein, in the line spectra increase step, an optical fiber for higher-order soliton compression, which is endowed with a higher-order soliton compression function, is used as the nonlinear optical fiber.

4. A standard radio frequency signal generating method as described in claim 3, wherein, in the line spectra selection step, the two line spectra of different wavelengths are selected by two fiber gratings which are connected via two optical circulators and have different reflection wavelengths.

5. A standard radio frequency signal generating method as described in claim 3, wherein, in the line spectra selection step, the two line spectra of different wavelengths are selected by an arrayed waveguide grating filter which is made from a plurality of waveguides of different lengths, and which multiplexes and demultiplexes light beams of a plurality of wavelengths.

6. A standard radio frequency signal generating method as described in claim 2, wherein, in the line spectra increase step, as the nonlinear optical fiber, there is used a dispersion decreasing optical fiber whose dispersion changes from anomalous dispersion to normal dispersion from an incident end thereof towards an emission end thereof, or an optical fiber for supercontinuum generation which is made from an optical fiber of uniform normal dispersion along an entire length in the longitudinal direction.

7. A standard radio frequency signal generating method as described in claim 6, wherein, in the line spectra selection step, the two line spectra of different wavelengths are selected by two fiber gratings which are connected via two optical circulators and have different reflection wavelengths.

8. A standard radio frequency signal generating method as described in claim 6, wherein, in the line spectra selection step, the two line spectra of different wavelengths are selected by an arrayed waveguide grating filter which is made from a plurality of waveguides of different lengths, and which multiplexes and demultiplexes light beams of a plurality of wavelengths.

9. A standard radio frequency signal generating device comprising, a light source which generates CW light of two different wavelengths;

a combiner which combines the CW light of two wavelengths and generates a beat signal of the CW light of two wavelengths; and a detector which heterodyne detects the beat signal, wherein the light source which generates the CW light of two different wavelengths comprises:

a single CW laser light source;

a modulation sideband generating unit which comprises a modulator whose modulation frequency is tunable, and which generates a modulation sideband made from a plurality of line spectra by modulating the CW light from the CW laser light source with the modulator, and a nonlinear optical material which increases the number of line spectra of the modulation sideband which is generated by the modulator: and a tunable wavelength filtering device which selects two of the line spectra from light output from the nonlinear optical material.

10. A standard radio frequency signal generating device as described in claim 9, wherein the nonlinear optical material is a nonlinear optical fiber.

11. A standard radio frequency signal generating device as described in claim 10, wherein the nonlinear optical fiber is an optical fiber for higher-order soliton compression, which is endowed with a higher-order soliton compression function.

12. A standard radio frequency signal generating device as described in claim 11, wherein the wavelength filtering device comprises two fiber gratings which are connected via two optical circulators and have different reflection wavelengths.

13. A standard radio frequency signal generating device as described in claim 11, wherein the wavelength filtering device comprises an arrayed waveguide grating filter which is made from a plurality of waveguides of different lengths, and which multiplexes and demultiplexes light beams of a plurality of wavelengths.

14. A standard radio frequency signal generating device as described in claim 12, wherein the nonlinear optical fiber is a dispersion decreasing optical fiber whose dispersion changes from anomalous dispersion to normal dispersion from an incident end thereof towards an emission end thereof, or is an optical fiber for supercontinuum generation which is made from an optical fiber of uniform normal dispersion along an entire length in the longitudinal direction.

15. A standard radio frequency signal generating device as described in claim 14, wherein the wavelength filtering device comprises two fiber gratings which are connected via two optical circulators and have different reflection wavelengths.

16. A standard radio frequency signal generating device as described in claim 14, wherein the wavelength filtering device comprises an arrayed waveguide grating filter which is made from a plurality of waveguides of different lengths, and which multiplexes and demultiplexes light beams of a plurality of wavelengths.

* * * * *